(12) United States Patent
Kobayashi (10) Patent No.: US 7,483,075 B2
(45) Date of Patent: Jan. 27, 2009

(54) IMAGE PICKUP APPARATUS (75) Inventor: Motoaki Kobayashi, Tachikawa (JP)

(73) Assignee: Olympus Corporation, Tokyo (JP)

( * ) Notice: Subject to any disclaimer, the term of this patent is extended or adjusted under 35 U.S.C. 154(b) by 756 days.

(21) Appl. No.: 10/867,911

(22) Filed: Jun. 14, 2004

(65) Prior Publication Data

US 2004/0263669 A1 Dec. 30, 2004

(30) Foreign Application Priority Data

Jun. 23, 2003 (JP) ............ 2003-178352

(51) Int. Cl.
H04N 5/225 (2006.01)
(52) U.S. Cl. ...................... 348/374
(58) Field of Classification Search ............ 348/374
See application file for complete search history.

(56) References Cited

U.S. PATENT DOCUMENTS

| | | | |
|---|---|---|---|
| 4,387,973 A | 6/1983 | Martin | |
| 4,441,796 A | 4/1984 | Shaw | |
| 4,841,387 A | 6/1989 | Rindfuss | |
| 4,920,420 A | 4/1990 | Sano et al. | |
| 5,161,008 A * | 11/1992 | Funk ...................... | 348/217.1 |
| 5,170,288 A | 12/1992 | Imaizumi et al. | |
| 5,910,700 A | 6/1999 | Crotzer | |
| 6,078,438 A | 6/2000 | Shibata et al. | |
| 6,163,340 A | 12/2000 | Yasuda | |
| 6,590,613 B2 | 7/2003 | Yasuda | |
| 2001/0053288 A1 | 12/2001 | Ito et al. | |
| 2002/0044215 A1 * | 4/2002 | Takagi et al. ............. | 348/374 |
| 2002/0171751 A1 | 11/2002 | Ohkawara | |
| 2003/0146980 A1 | 8/2003 | Shimada | |
| 2003/0202114 A1 | 10/2003 | Takizawa et al. | |
| 2003/0214588 A1 | 11/2003 | Takizawa et al. | |
| 2003/0214599 A1 | 11/2003 | Ito et al. | |
| 2003/0218685 A1 | 11/2003 | Kawai | |
| 2004/0012714 A1 | 1/2004 | Kawai | |
| 2004/0047625 A1 | 3/2004 | Ito et al. | |
| 2004/0090549 A1 | 5/2004 | Takizawa et al. | |
| 2004/0169761 A1 | 9/2004 | Kawai et al. | |
| 2004/0227837 A1 | 11/2004 | Ito | |

FOREIGN PATENT DOCUMENTS

JP 57-078032 5/1982

(Continued)

Primary Examiner—Lin Ye
Assistant Examiner—Anthony J Daniels
(74) Attorney, Agent, or Firm—Frishauf, Holtz, Goodman, Chick, PC (57) ABSTRACT In order to effectively and rapidly prevent, by use of a dustproof unit inside an image pickup unit, dust that has an adverse effect on the pickup of input images from sticking to optical members and to improve assembly for a simpler configuration, in an image pickup apparatus, a dustproof unit comprises a dustproof filter capable of vibrating in front of the image pickup device to prevent the dust from sticking to the image pickup device, an electrostrictive element for vibrating the dustproof filter, a flexible printed board on which there is mounted at least a drive circuit to drive and vibrate the electrostrictive element, and a support table provided with the flexible printed board, the electrostrictive element and the dustproof filter, and this dustproof unit is mounted in an image pickup unit in consideration of the assembly.

15 Claims, 7 Drawing Sheets

FOREIGN PATENT DOCUMENTS

| | | |
|---|---|---|
| JP | 62-165127 | 7/1987 |
| JP | 01-230016 | 9/1989 |
| JP | 03-244281 | 10/1991 |
| JP | 05-213286 | 8/1993 |
| JP | 07-151946 | 6/1995 |
| JP | 07-322153 | 12/1995 |
| JP | 08-079633 | 3/1996 |
| JP | 09-130654 | 5/1997 |
| JP | 2000-29132 A | 1/2000 |
| JP | 2000-330054 A | 11/2000 |
| JP | 2001-298640 A | 10/2001 |
| JP | 2001-359287 A | 12/2001 |
| JP | 2002-204379 A | 7/2002 |
| JP | 2002204379 A * | 7/2002 |
| JP | 2002-229110 A | 8/2002 |
| JP | 2003-333391 A | 11/2003 |

* cited by examiner

FIG. 10 is based upon and claims the benefit of priority from prior Japanese Patent Application No. 2003-178352, filed Jun. 23, 2003, the entire contents of which are incorporated herein by reference.

IMAGE PICKUP APPARATUS

CROSS-REFERENCE TO RELATED APPLICATIONS

This application is based upon and claims the benefit of priority from prior Japanese Patent Application No. 2003-178352, filed Jun. 23, 2003, the entire contents of which are incorporated herein by reference.

BACKGROUND OF THE INVENTION

1. Field of the Invention

The present invention relates to an image pickup apparatus such as an electronic camera, and in particular relates to an image pickup apparatus which prevents dust and the like from sticking to or depositing on a surface or the like of an image pickup device such as a CCD (charge coupled device).

2. Description of the Related Art

Recently, electronic cameras capable of lens exchange have been generally in practical use which comprise a finder device adopting a so-called single lens reflex method and in which a photography optical system is configured detachably from a camera main unit so that a user optionally attaches/detaches the photography optical system and replaces with a desired photography optical system to allow plural kinds of photography optical systems to be selectively used in the single camera main unit. In such electronic cameras, when the photography optical system is detached from the camera main unit, dust and the like floating in the air can enter the camera main unit. In addition, since mechanisms such as a shutter unit and a mirror unit are provided inside the camera main unit, dust may be produced while these mechanisms are operating. Further, when the photography optical system is detached from the camera main unit, a light acceptance surface of an image pickup device disposed in the rear of the photography optical system is exposed to the air inside the camera, so that dust and the like stick to the vicinity of the light acceptance surface of the image pickup device due to factors such as static electricity. Nowadays, such dust having an adverse effect on the pick up of input images is a problem, and various techniques have been proposed to prevent the dust and the like from sticking.

For example, Jpn. Pat. Appln. KOKAI Publication No. 2000-29132 discloses a technique to prevent dust or fuzz from sticking due to electrification of optical members and photoelectric transfer elements provided in an optical path of an optical device. Thus, in this technique, transparent electrodes are provided on a surface of a cover member covering the light acceptance surface of the image pickup device inside the camera, and a direct current voltage or the like is applied to the electrodes, thereby preventing dust and the like from sticking onto the light acceptance surface of the image pickup device due to static electricity.

BRIEF SUMMARY OF THE INVENTION

The present invention is characterized by effectively and rapidly preventing, by use of a dustproof unit inside an image pickup unit, dust that has an adverse effect on the pickup of input images from sticking to optical members, and improving assembly for a simpler configuration.

In order to achieve this, in one aspect of the present invention, an image pickup apparatus is provided in which a dustproof unit for the image pickup apparatus is disposed in front of an image pickup device to prevent dust from sticking to the image pickup device. The dustproof unit comprises: a light transmitting member capable of vibrating in front of the image pickup device; an electrostrictive element which vibrates the light transmitting member; an electric circuit board on which there is mounted at least part of a drive circuit to drive and vibrate the electrostrictive element; and a support table provided with the electric circuit board, the electrostrictive element and the light transmitting member.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will hereinafter be described referring to the drawings.

An image pickup apparatus according to one embodiment of the present invention has a characteristic in improving assembly in such a manner that configurations for protection against dust and an electric substrate having part of a drive element are combined into one as a dustproof unit, and this dustproof unit is disposed in front of the electric substrate having an image pickup device and is attached to the rear of a front plate unit to which a shutter unit is attached. In view of this, the embodiment will hereinafter be described in detail.

Figure 1:
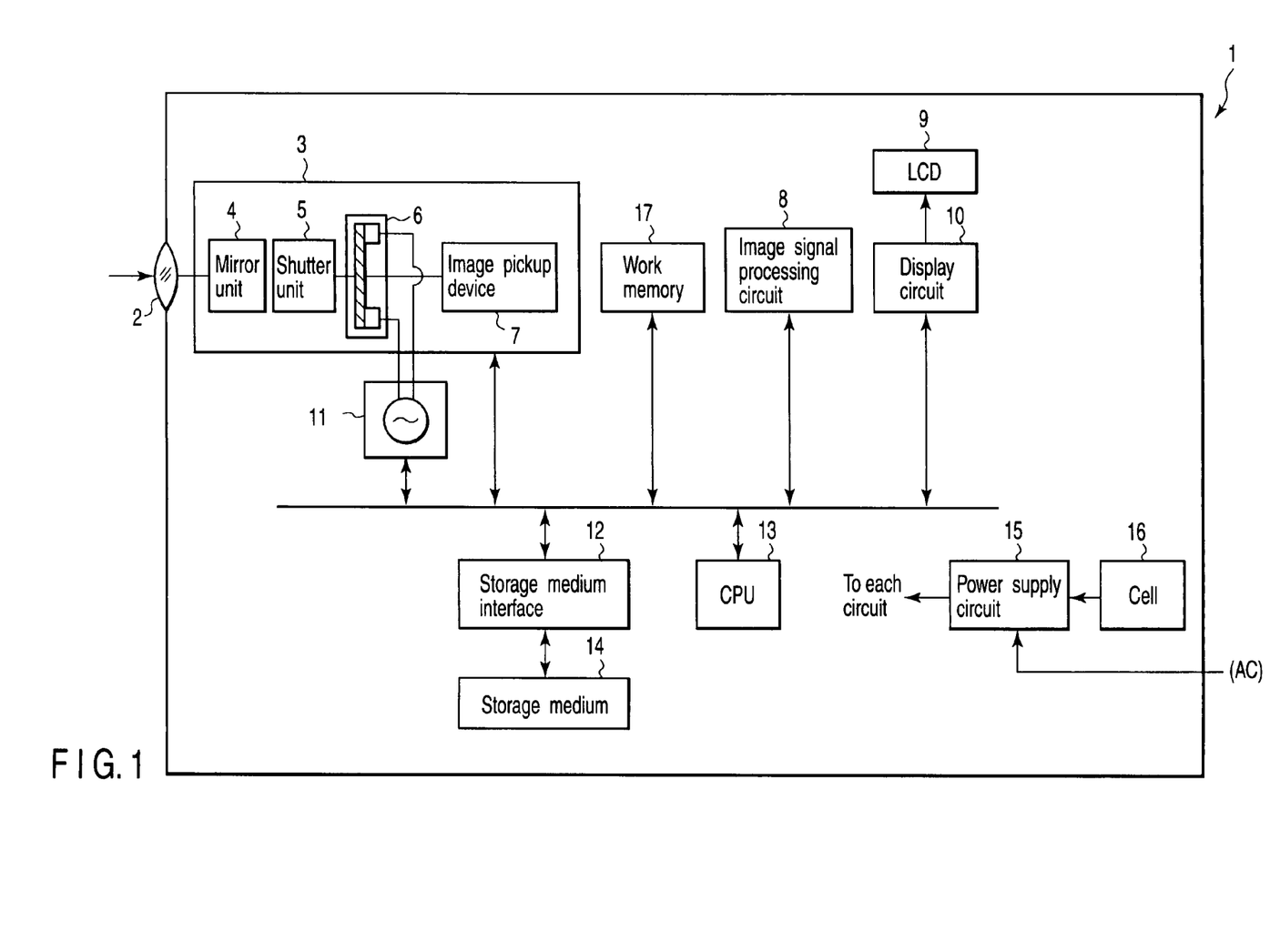
FIG. 1 is a configuration diagram mainly of an electric system of a digital camera 1 as an image pickup apparatus according to one embodiment of the present invention.

First, FIG. 1 shows a configuration mainly of an electric system of a digital camera 1 as the image pickup apparatus according to one embodiment of the present invention, and the configuration and function thereof will be described.

Here, a digital camera adopting a single lens reflex method is assumed. In other words, it is a single lens reflex camera.

As shown in FIG. 1, the digital camera 1 is provided with a CPU 13 which controls the entirety. The CPU 13 is connected via a control bus, in a state capable of communicating, to a storage medium interface 12 for sending image data to a storage medium 14, a display circuit 10 which drives and controls an LCD display section 9, an image signal processing circuit 8, a work memory 17, and a dustproof filter drive section 11. Moreover, an image pickup unit 3 is provided in the rear of a taking lens 2. The image pickup unit 3 is constituted of a mirror unit 4, a shutter unit 5, a dustproof unit 6, an image pickup device 7, and the like.

In such a configuration, a subject light incident via the taking lens 2 is formed into an image on a light acceptance surface of the image pickup device 7 via the mirror unit 4, the shutter unit 5 and the dustproof unit 6 in the image pickup unit 3. The mirror unit 4 comprises a movable quick return mirror or the like for leading the subject light to observation optics which is not shown here. The shutter unit 5 comprises a shutter mechanism or the like which controls, for example, the time to irradiate the light acceptance surface of the image pickup device 7 with a subject luminous flux, and a focal plane type shutter mechanism is adopted, for example. Further, the dustproof unit 6 is provided at a predetermined position in front of the image pickup device 7, and comprises a dustproof filter which is a plane glass having a thin plate shape to prevent dust and the like from sticking to the light acceptance surface of the image pickup device 7. The dustproof filter drive section 11, including an oscillator or the like, drives the dustproof filter in the dustproof unit 6.

The image pickup device 7 receives, in its photoelectric transfer surface, the subject luminous flux that has penetrated the taking lens 2 and subjects it to photoelectric transfer processing to obtain an image signal corresponding to a subject image to be formed on the photoelectric transfer surface, and for example, a charge coupled device (CCD) can be adopted. The image pickup device 7 outputs the image signal corresponding to the subject image to be formed on the basis of the subject luminous flux that has penetrated the taking lens 2.

Receiving this image signal, the image signal processing circuit 8 subjects the image signal to various kinds of image processing. The work memory 17 temporarily stores the image signal and image data which has been processed by the image signal processing circuit 8, and various kinds of information attached thereto. The storage medium 14 receives, via the storage medium interface 12, the image data in a predetermined form to be recorded which has been generated by the image signal processing circuit 8, and stores the image data in a predetermined area. The display circuit 10 receives the image signal processed by the image signal processing circuit 8 to generate an image signal to be displayed which is suitable to be displayed by use of the LCD display section 9. The LCD display section 9 performs predetermined display based on the image signal.

In addition to the above, a cell 16 includes, for example, a secondary cell such as a dry cell. Receiving electric power from an external power supply (AC) supplied by the cell 16, a predetermined connection cable or the like, a power supply circuit 15 performs control in a suitable manner to operate the digital camera 1 and distributes electricity to electric circuits.

Next, a detailed configuration of the image pickup unit 3 provided in the digital camera 1 as the image pickup apparatus according to one embodiment of the present invention will be described referring to FIG. 2 to FIG. 6.

Figure 2:
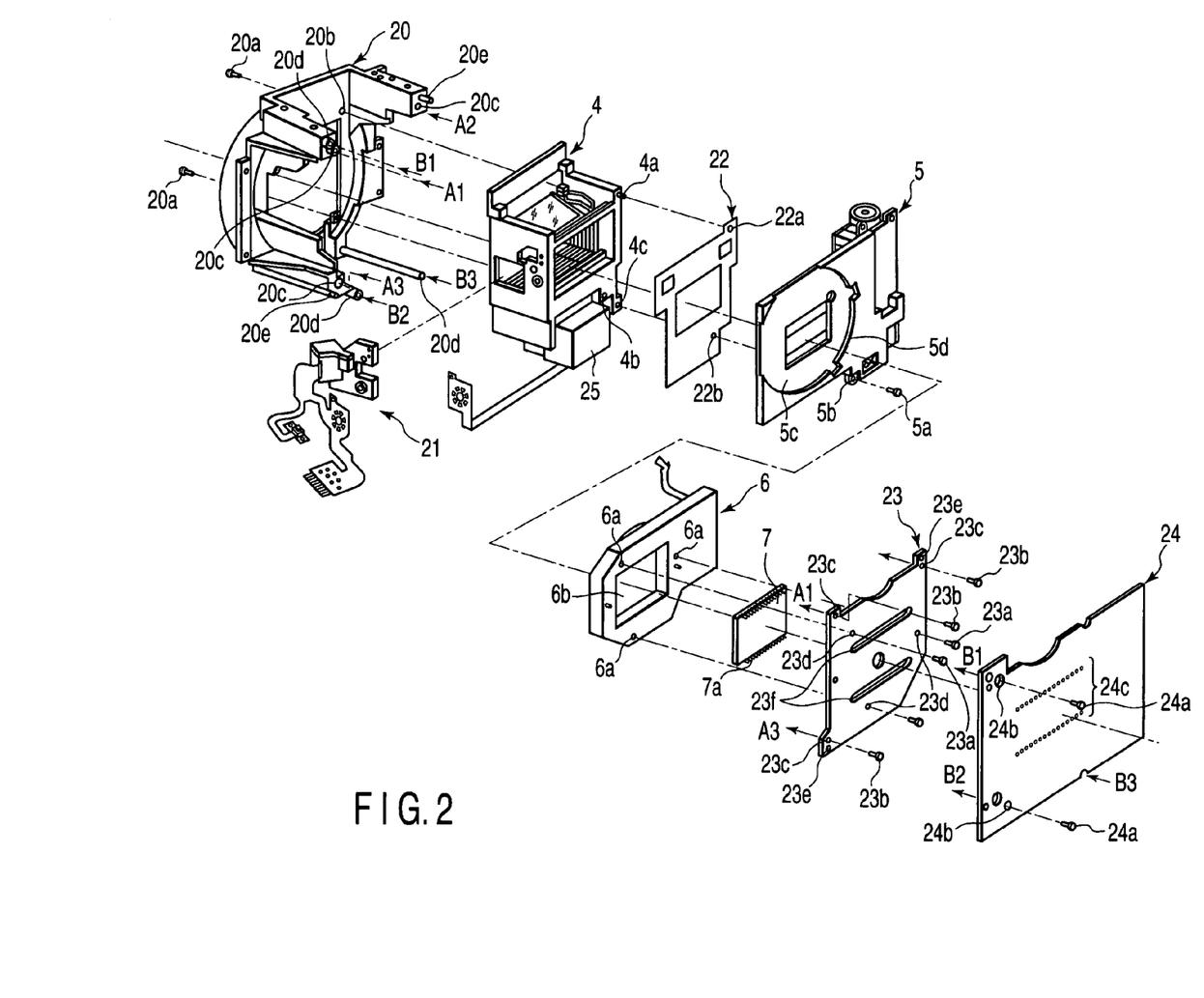
FIG. 2 is a detailed configuration diagram of an image pickup unit 3.
Figure 3:
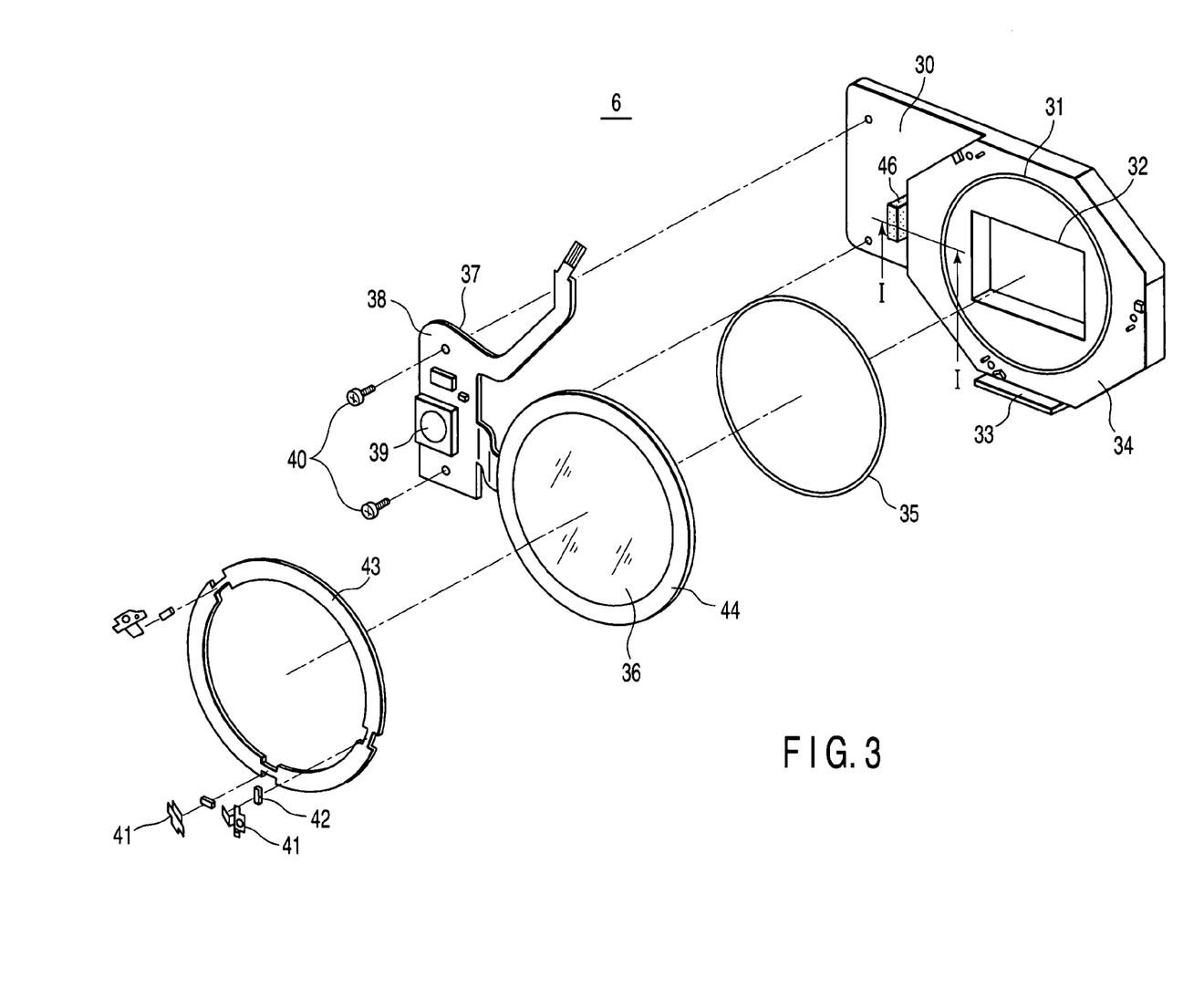
FIG. 3 is a detailed configuration diagram of a dustproof unit 6.
Figure 4:
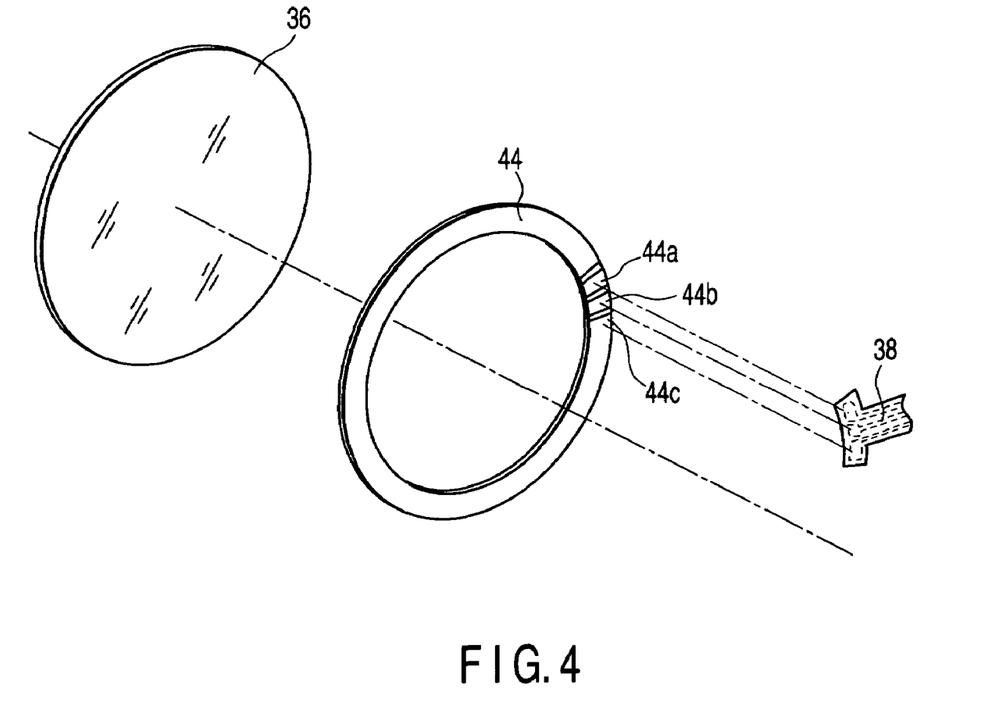
FIG. 4 is a detailed configuration diagram of a piezoelectric element 44 in the dustproof unit 6.
Figure 5:
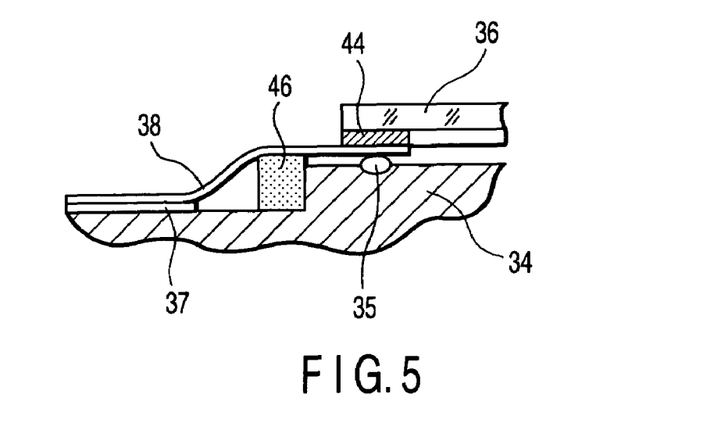
FIG. 5 is a sectional view along the A-A line of FIG. 3.
Figure 6:
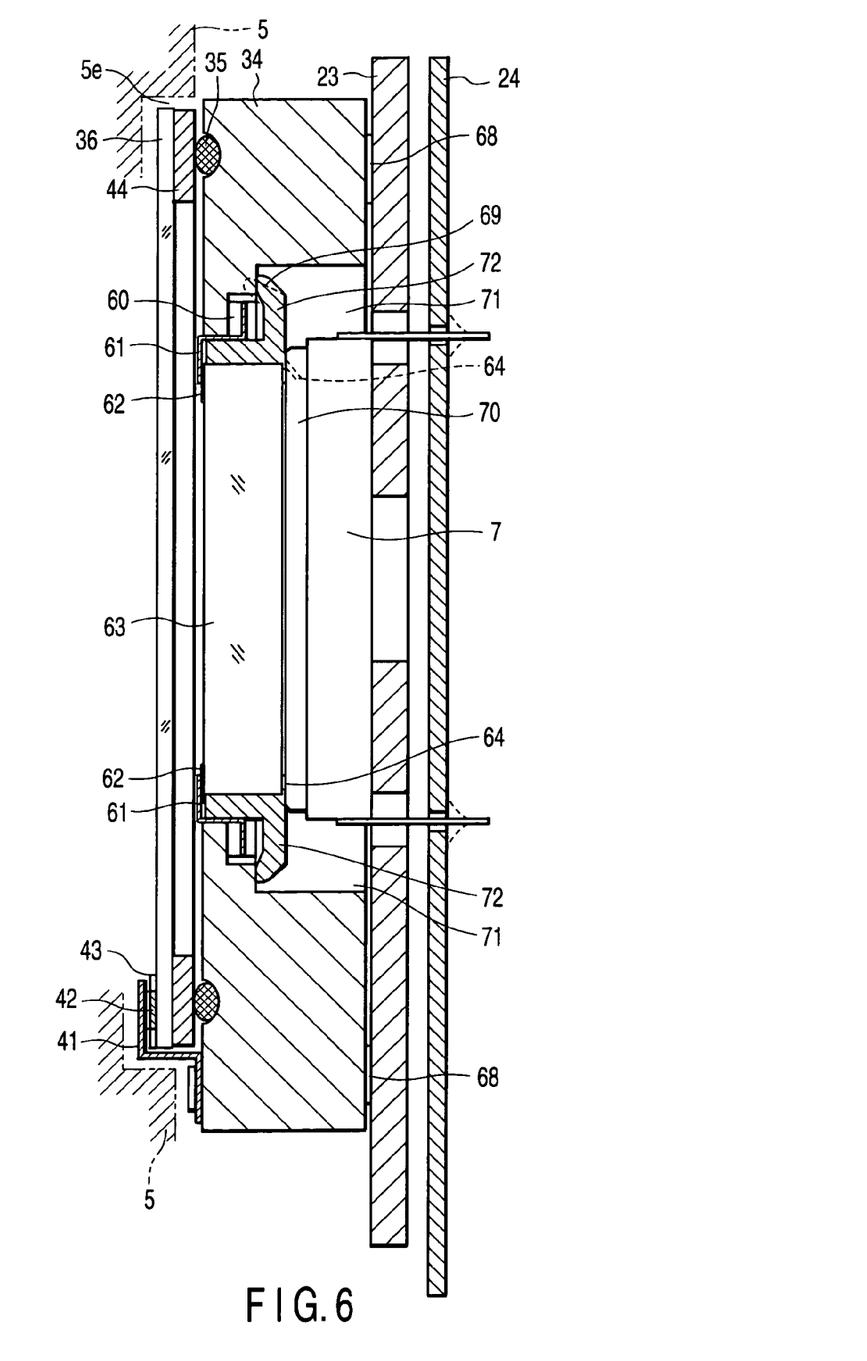
FIG. 6 is a partial sectional view of the image pickup unit.

FIG. 2 is an exploded perspective view showing the disassembled image pickup unit 3, FIG. 3 is an exploded perspective view showing the disassembled dustproof unit 6, FIG. 4 is an exploded perspective view showing in detail an arrangement relationship between a dustproof filter 36 which is a light transmitting member plate and a piezoelectric element 44, FIG. 5 is a sectional view along the I-I line of FIG. 3, and FIG. 6 is a partial sectional view when the dustproof unit 6, the image pickup device 7, an image pickup device support plate 23, an electric substrate 24 and the like are integrally configured.

As shown in FIG. 2, the mirror unit 4 is inserted from a rear side of a front plate unit 20 into a space regulated by four props extending in a direction of an optical axis of the front plate unit 20. Then, screws 20a inserted through openings 20b from a front side of the front plate unit 20 are tightened into unshown screw holes of the mirror unit 4. Thereby, the mirror unit 4 is fixed to the front plate unit 20. A reflection-photometry unit 21 is fixed to a side surface part of the mirror unit 4, and an AF unit 25 is further fixed to a lower surface part of the mirror unit 4.

Furthermore, openings 22a, 22b of a shutter bottom plate protection sheet 22 are positioned to convex portions 4a, 4b provided on a rear side of the mirror unit 4, and a screw 5a inserted from a rear side of the shutter unit 5 through an opening 5b is tightened into a screw hole 4c of the mirror unit 4 with the shutter bottom plate protection sheet in between. Thereby, the shutter unit 5 is fixed to the mirror unit 4 with the shutter bottom plate protection sheet 22 in between. The shutter bottom plate protection sheet 22 mainly has a mask function as an aperture to decide a necessary luminous flux of the subject luminous flux, and also has a protection function to protect a shutter bottom plate against unnecessary light.

On a rear side of the shutter unit 5, that is, in a rear surface of the shutter unit 5 on the side of the image pickup device, a round depression 5c (concave shape) is provided where the dustproof filter 36 provided in the dustproof unit 6 is positioned and provided. In other words, an outer diameter of the dustproof filter 36 is fitted into a depression peripheral surface 5d of the depression 5c. This fitting means brings them into an almost airtightly fitted state. Such a configuration also prevents dust and the like from sticking to the filter surface.

However, this fitting is desirably an idle fit state, that is, there is a clearance, 5e, between the internal peripheral surface of the depression and an outer diameter surface of the dustproof filter. This is because if the internal peripheral surface of the depression contacts the outer diameter surface of the dustproof filter and ultrasonic vibration is given to the dustproof filter, the vibration might be hampered. Moreover, if this ring-shaped clearance must be filled, it can be covered with, for example, a ring-shaped rubber which is a considerably flexible material and which does not hamper the vibration.

Furthermore, the image pickup device 7 is secured to the image pickup device support plate 23 by an adhesive in such a configuration that electrodes of the image pickup device 7 extend out of openings 23f of the image pickup device support plate 23.

The image pickup device 7 and the image pickup device support plate 23 are inserted from a rear side of the dustproof unit 6 in such a manner that a longitudinal direction of the image pickup device 7 is positioned by an opening 6b of the dustproof unit 6. Moreover, screws 23a inserted from a rear side of the image pickup device support plate 23 through openings 23d are tightened into screw holes 6a of the dustproof unit 6. Thereby, the image pickup device support plate 23 is fixed to the dustproof unit 6. At this point, screws 23b inserted from the rear side of the image pickup device support plate 23 through openings 23c are tightened into screw holes 20c of the front plate unit 20, and openings 23e of the image pickup device support plate 23 are fitted into by convex portions 20e of the front plate unit 20. Thereby, the image pickup device support plate 23 is fixed to the front plate unit 20.

Furthermore, the electric substrate 24 is inserted from a rear side, with the electrodes of the image pickup device 7 extending out of openings 24c of the electric substrate 24, and screws 24a inserted from a rear side of the electric substrate 24 through openings 24b are tightened into screw holes 20d of the front plate unit 20. In this way, the electric substrate 24 is fixed to the front plate unit 20 with at least the mirror unit 4, the shutter bottom plate protection sheet 22, the shutter unit 5, the dustproof unit 6, the image pickup device 7 and the image pickup device support plate 23 in between. On the electric substrate 24, there are mounted electric circuits of an image pickup system comprising the image signal processing circuit 8, the work memory 17 and the like, but they are generally applied to conventional digital cameras and therefore will not be described in detail any more.

Here, a configuration of the dustproof unit 6 will be described in greater detail.

As shown in FIG. 3, a support table 30 for a flexible printed board 38 is integrally formed with a support table 34. The support table 34 is provided with an opening 32 to fill the image pickup device 7 and an optical low pass filter (hereinafter referred to as an optical filter) 63, and is further provided with a dustproof groove 31 for an O-ring (dustproof sealing member) 35. Here, as shown in FIG. 4, the piezoelectric element 44 formed of ceramics is provided with a front side electrode 44a and a monitor electrode 44b provided in a surface on the side of a subject in a plate thickness direction of the piezoelectric element 44 which is not only an electrostrictive element but also an ultrasonic vibration element, and with a rear side electrode 44c in a rear surface of the front side electrode 44a. The monitor electrode 44b is used to monitor whether the piezoelectric element 44 is driven in a manufacturing process.

The front side electrode 44a is provided on a joint surface, which is not shown in FIG. 4, of the piezoelectric element 44 where it is joined to the dustproof filter 36, and the front side electrode 44a is extended as shown in the diagram to the rear side of the piezoelectric element 44 through part of an outer peripheral side surface of the piezoelectric element 44 to facilitate electrical junction with the flexible printed board 38 which is an electric circuit board. The electrodes 44a, 44b and 44c are separated in independent areas via insulation areas.

In such a configuration, the flexible printed board 38 has electric contact points corresponding to the electrodes 44a, 44b and 44c, and the electric contact points are joined to only the rear side of the piezoelectric element 44 so that each of them is connected. Further, the dustproof filter 36 is joined to the front side of the piezoelectric element 44 with an adhesive. It is to be noted that parts of a drive circuit to drive the piezoelectric element 44, such as a drive transformer 39 and a switching transistor 45, are provided on the flexible printed board 38, as shown in FIG. 3.

Furthermore, as shown in FIG. 3 and FIG. 6, the O-ring 35 is fitted into the dustproof groove 31 of the support table 34, and the rear side of the piezoelectric element 44 coupled with the dustproof filter 36 as described above further contacts the O-ring 35. Moreover, a holding sheet member 43 is provided on a front side of the dustproof filter 36, and fixed to the support table 34 by holding spring members 41 (at three places in this example).

An adhesive sheet 42, to prevent vibration of the holding spring members 41 caused when the dustproof filter 36 is vibrated and driven, is present between a plane of the holding sheet member 43 and the holding spring members 41. It is to be noted that the holding spring members 41 are used to make effective use of the drive of the piezoelectric element 44 without hampering it.

Furthermore, as shown in FIG. 3, the flexible printed board 38 is screwed to the flexible table 30 with screws 40 in such a positional relationship that a backing substrate 37 provided on a rear surface of the flexible printed board 38 contacts a plane of the flexible table 30.

Here, as in FIG. 5 showing a sectional view along the I-I line of FIG. 3, part of an area of the support table 30 is provided with a kinetic energy absorbing member such as a rubber material 46 so that the flexible printed board 38 is not damaged by an edge of the support table 34 while the dustproof filter 36 is vibrating. Moreover, the O-ring 35 placed between the dustproof groove 31 and the piezoelectric element 44 (part of which is the flexible printed board 38) increases airtightness in the vicinity of the opening 32 of the support table 34. Such a configuration also prevents dust and the like from sticking to the filter surface.

Furthermore, as shown in FIG. 6, the dustproof unit 6 is positioned by a receiving portion 68 when being disposed on the image pickup device support plate 23. Moreover, a protection glass 70 and the optical filter (low pass filter) 63 are sequentially provided in front of the image pickup device 7. A peripheral edge of the optical filter 63 is covered with a dustproof member 72 made of a rubber material. A contact portion 69 of the dustproof member 72 is brought in contact with an inner surface of the support table 34 to prevent dust and the like in a space 71 from entering the front of the optical filter 63. Further, a thin contact portion 64 of the dustproof member 72 is closely bonded between the protection glass 70 and the optical filter 63 to prevent dust and the like in the space 71 from entering the front of the protection glass 70 and the rear of the optical filter 63. The optical filter 63 and the dustproof member 72 are subjected to an optical direction elastic force by a spring portion 60 via a holding member 61 in a direction toward the rear side which is the side of the image pickup device 7 in an optical direction, and they are pressed toward the image pickup device 7. It is to be noted that a protection sheet 62 to protect the optical filter 63 is provided between the holding member 61 and the optical filter 63.

Figure 7:
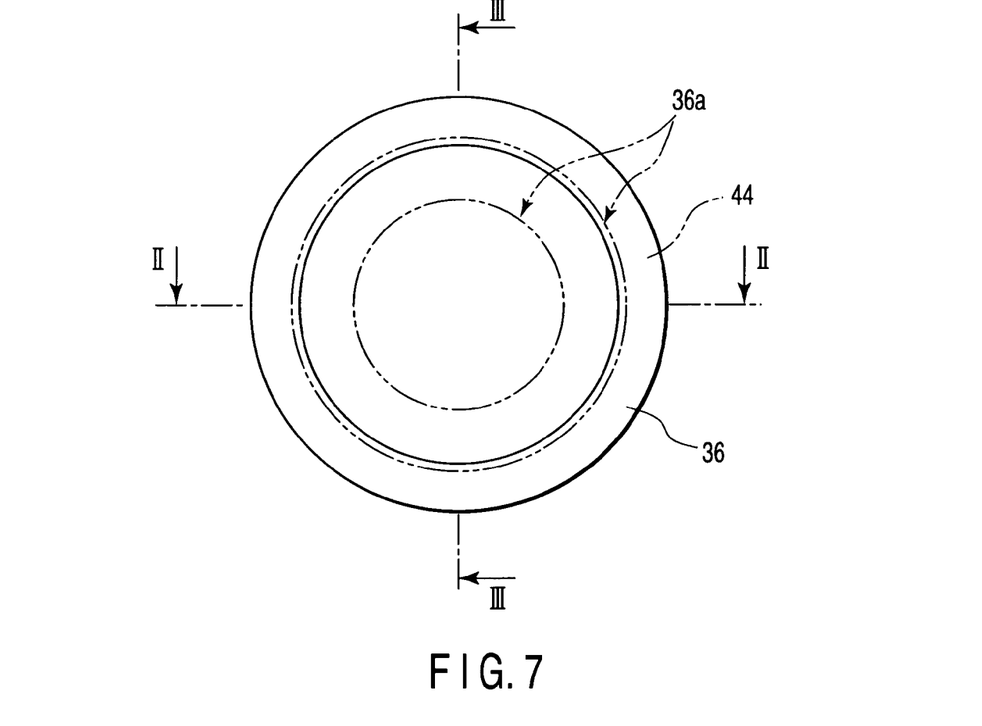
FIG. 7 is a front view taking out and showing only a dustproof filter 36 and the piezoelectric element 44 provided integrally therewith in the image pickup unit 3.
Figure 8:
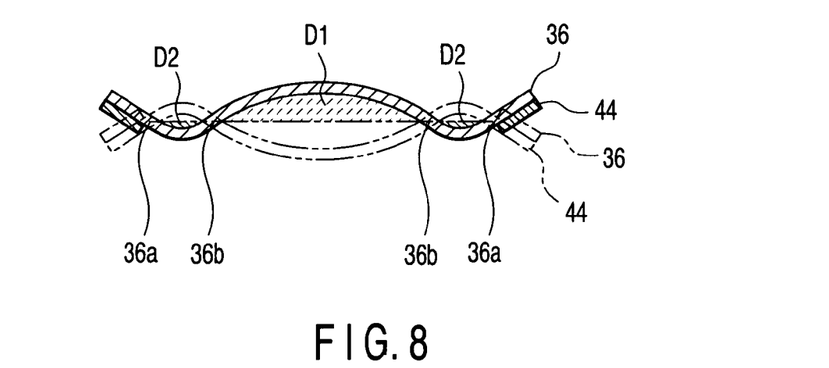
FIG. 8 is a sectional view along the B-B line of FIG. 7.
Figure 9:
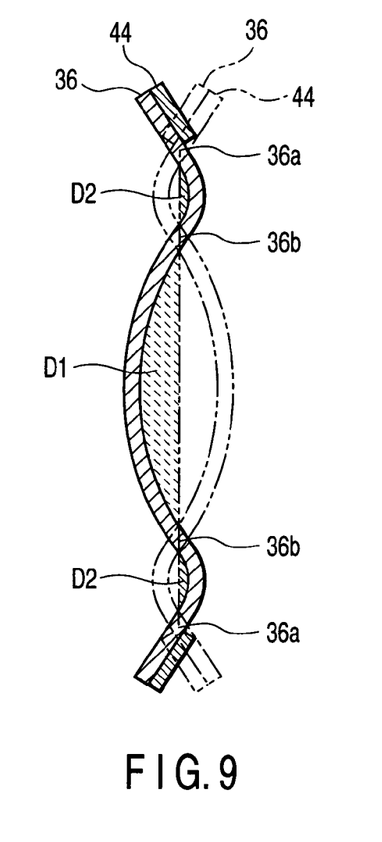
FIG. 9 is a sectional view along the C-C line of FIG. 7.
Figure 10:
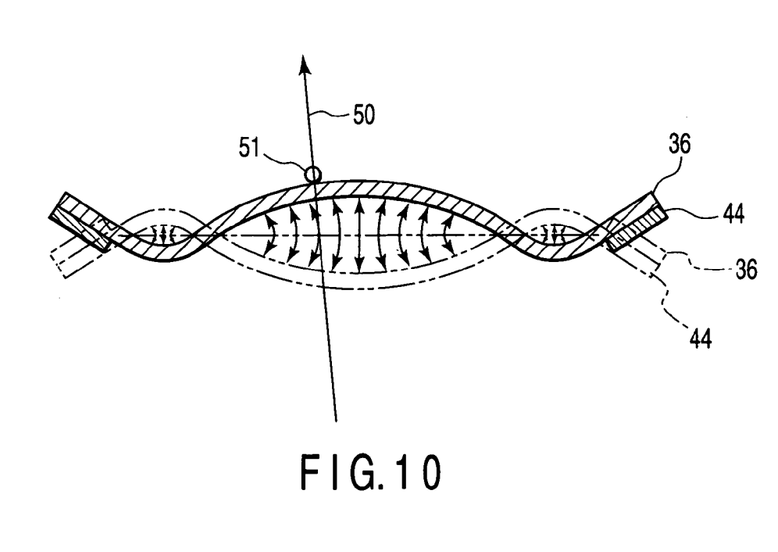
FIG. 10 is a diagram showing how dust and the like, for example, sticking to the dustproof filter 36 are removed by vibration of the piezoelectric element 44.

Next, FIG. 7 to FIG. 10 show a secondary vibration caused to the dustproof filter 36. FIG. 7 is a front view showing only the dustproof filter 36 and the piezoelectric element 44 provided integrally therewith in the image pickup unit 3 of the digital camera 1. FIG. 8 and FIG. 9 show a state change of the dustproof filter 36 and the piezoelectric element 44 when a voltage is applied to the piezoelectric element 44 of FIG. 7, and FIG. 8 is a sectional view along the II-II line of FIG. 7, and FIG. 9 is a sectional view along the III-III line of FIG. 7. In addition, FIG. 10 is a diagram showing how dust and the like actually sticking are removed by vibration.

When an alternating current voltage is applied to the piezoelectric element 44, the dustproof filter 36 is deformed as indicated by solid lines in FIG. 8 and FIG. 9, while the dustproof filter 36 is deformed and vibrated as indicated by dotted lines in FIG. 8 and FIG. 9. In this case, two pairs of nodes are present in this vibration as indicated by numerals 36a, 36b in FIG. 8 and FIG. 9, but amplitude is substantially zero at positions of the nodes of the amplitude, so that a convex portion of the holding spring members 41 of the dustproof filter 36 is set to contact the vicinity of a part corresponding to the node 36a to enable the dustproof filter 36 to be efficiently supported without hampering the vibration.

In this state, the dustproof filter drive section 11 is controlled at a predetermined time to apply a periodic voltage to the piezoelectric element 44, whereby the dustproof filter 36 is vibrated and dust and the like sticking to the surface of the dustproof filter 36 are removed. In addition, a resonance frequency at this moment is decided by, for example, shape, and plate thickness and material of the dustproof filter 36. In this embodiment, as an example, the resonance frequency is 30 kHz, and the plate thickness is 0.65 mm, which are naturally not limited.

An example of how the secondary vibration is produced has been shown above, but a higher degree of vibration may be produced. When the secondary vibration is caused, a volume change of a sealed space caused by the amplitude of the dustproof filter 36 is a result of subtracting double an area indicated by a numeral D2 from an area indicated by a numeral D1 (D1−(D2×2)).

Here, as shown in FIG. 10, a rotation curvature of a vibration track becomes larger as the positions of the nodes 36a, 36b approach, and dust and the like sticking to the surface of the dustproof filter 36 are blown by a force in a tangential direction of the arc and collected at the positions of the nodes 36a, 36b. However, in the embodiment, since the dustproof filter 36 is provided as shown in FIG. 9, the dust is actually dropped by gravity and collected in a dust receiving portion 33.

In addition, a light transmitting member set forth in the claims corresponds to the dustproof filter 36 or the like. The ultrasonic vibration element corresponds to the piezoelectric element 44 or the like. The parts of the drive circuit include, for example, the drive transformer 39 and the switching transistor 45. The electric circuit board corresponds to the flexible printed board 38 or the like. The support tables correspond to the support tables 30 and 34. Moreover, a shutter is included in the shutter unit 5. However, these relations are naturally not limitations.

As described above, according to the embodiment of the present invention, the dustproof filter 36 and the piezoelectric element 44 for protection against dust, and the flexible printed board 38 having part of the drive element are combined into one as the dustproof unit 6, and the dustproof unit 6 is disposed in front of the image pickup device support plate 23 having the image pickup device 7, and by adopting the image pickup unit 3 in which the dustproof unit 6 is attached in the rear of the front plate unit 20 to which the mirror unit 4 and the shutter unit 5 are attached, the image pickup apparatus improving the assembly can be provided.

While the embodiment of the present invention has been described above, the present invention is not limited thereto and various improvements and modifications can naturally be made without departing from its spirit. A further configuration for protection against dust may be added to the image pickup unit.

As described above in detail, according to the present invention, it is possible to provide the image pickup apparatus which effectively and rapidly prevents, by use of the dustproof unit inside the image pickup unit, dust having an adverse effect on the pickup of input images from sticking to optical members, and which improves the assembly for a simpler configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A dustproof unit for an image pickup device, the dustproof unit being disposed in front of the image pickup device to prevent dust from sticking to the image pickup device, the dustproof unit comprising:

a light transmitting member capable of vibrating in front of the image pickup device;

an electrostrictive element which vibrates the light transmitting member;

a flexible printed board on which there is mounted at least part of a drive circuit to drive and vibrate the electrostrictive element;

a support table which supports the flexible printed board, the electrostrictive element and the light transmitting member; and a kinetic energy absorbing member which prevents the flexible printed board from being damaged by vibration of the light transmitting member.

2. The dustproof unit according to claim 1, further comprising a substrate fixed to the support table and supporting the image pickup device.

3. The dustproof unit according to claim 1, wherein said at least part of the drive circuit includes a drive transformer.

4. The dustproof unit according to claim 1, wherein the light transmitting member is made of a round glass plate.

5. The dustproof unit according to claim 1, wherein the kinetic energy absorbing member is provided between the flexible printed board and the support table.

6. An image pickup apparatus comprising:

an image pickup device which obtains an image signal corresponding to an irradiated light;

a light transmitting member which is disposed in front of the image pickup device and which vibrates in front of the image pickup device to prevent dust from sticking to the image pickup device;

an electrostrictive element which vibrates the light transmitting member;

a flexible printed board on which there is mounted at least part of a drive circuit to drive and vibrate the electrostrictive element;

a support table provided with the flexible printed board, the electrostrictive element and the light transmitting member; and a kinetic energy absorbing member which prevents the flexible printed board from being damaged by vibration of the light transmitting member.

7. The image pickup apparatus according to claim 6, further comprising a substrate fixed to the support table and supporting the image pickup device.

8. The image pickup apparatus according to claim 6, wherein the part of the drive circuit includes a drive transformer.

9. The image pickup apparatus according to claim 6, wherein the light transmitting member is made of round plate glass.

10. The image pickup apparatus according to claim 6, further comprising a shutter unit which shuts out a photography light, and wherein the light transmitting member and the image pickup device are sequentially disposed in a rear portion of the shutter unit.

11. The image pickup apparatus according to claim 10, further comprising fitting means for fitting the shutter unit and the light transmitting member to each other, and wherein the shutter unit covers a front surface and a periphery of the light transmitting member when photography is not performed.

12. The image pickup apparatus according to claim 10, wherein a peripheral surface of the light transmitting member is fitted into a concavity provided in the shutter unit.

13. The image pickup apparatus according to claim 6, wherein the kinetic energy absorbing member is provided between the flexible printed board and the support table.

14. An image pickup apparatus comprising an image pickup unit in which unit there are sequentially disposed:
- a front plate unit to which a photography optical system is attachable;
- a mirror unit fixed to the front plate unit;
- a shutter unit fixed to the mirror unit;
- a dustproof unit disposed in a rear portion of the shutter unit and fixed to the front plate unit;
- an image pickup device provided in a predetermined opening of the dustproof unit;
- an image pickup device support plate which supports the image pickup device;
- a flexible printed board which is fixed to at least the front plate unit; and wherein the dustproof unit has a dustproof filter and an electrostrictive element which vibrates the dustproof filter, and at least part of a drive circuit is mounted on the flexible printed board to electrically drive the electrostrictive element to vibrate the dustproof filter to prevent sticking of dust to the image pickup device; and wherein the image pickup apparatus further comprises a kinetic energy absorbing member which prevents the flexible printed board from being damaged by vibration of the dustproof filter.

15. The image pickup apparatus according to claim 14, wherein the image pickup apparatus is a single lens reflex camera.

* * * * *